US010994212B2

(12) United States Patent
Suzuki (10) Patent No.: US 10,994,212 B2
(45) Date of Patent: *May 4, 2021

(54) VIDEO GAME PROCESSING APPARATUS AND VIDEO GAME PROCESSING PROGRAM (71) Applicant: KABUSHIKI KAISHA SQUARE ENIX, Tokyo (JP)

(72) Inventor: Shingo Suzuki, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,668

(22) Filed: Oct. 9, 2019

(65) Prior Publication Data

US 2020/0061475 A1 Feb. 27, 2020

Related U.S. Application Data

(63) Continuation of application No. 15/601,381, filed on May 22, 2017, now Pat. No. 10,500,502, which is a (Continued)

(30) Foreign Application Priority Data

Dec. 7, 2012 (JP) .................................. 2012-268382

(51) Int. Cl.
*A63F 13/822* (2014.01)
*A63F 13/537* (2014.01)
*A63F 13/45* (2014.01)

(52) U.S. Cl.
CPC ............ *A63F 13/822* (2014.09); *A63F 13/45* (2014.09); *A63F 13/537* (2014.09)

(58) Field of Classification Search
None
See application file for complete search history.

(56) References Cited

U.S. PATENT DOCUMENTS 6,729,960 B1   5/2004 Matsuno
7,690,992 B2 * 4/2010 Itou ..................... A63F 13/00
                                                      463/31

(Continued)

FOREIGN PATENT DOCUMENTS

JP   2001-009150   1/2001
JP   2010-063720   3/2010

(Continued)

OTHER PUBLICATIONS

Office Action from Japan Patent Office (JPO) in Japanese Patent Application No. 2017-132808, dated Dec. 17, 2019, together with an English language translation.

(Continued)

*Primary Examiner* — Ronald Laneau
(74) *Attorney, Agent, or Firm* — Greenblum & Bernstein, P.L.C.

(57) ABSTRACT

An event information memory for storing event information and an event management information memory for storing event management information are provided. The event information contains an event and an event execution time defined in advance as time from start of the event to its end. The event management information contains executing event related information on an executing event and a maximal allowed time that is allowed as the maximum of a total time of a remaining time of each executing event. The executing event related information is updated in accordance with an elapse of time. A display device is caused to display an event progress status graph on a display screen of the display device on the basis of the event management information. The event progress status graph indicates a status of the remaining time of each executing event in the maximal allowed time.

14 Claims, 5 Drawing Sheets

100: VIDEO GAME PROCESSING APPARATUS

Related U.S. Application Data continuation of application No. 14/093,163, filed on Nov. 29, 2013, now abandoned.

(56) References Cited

U.S. PATENT DOCUMENTS

| | | | |
|---|---|---|---|
| 8,366,554 | B1 | 2/2013 | Yuan |
| 2005/0255923 | A1 | 11/2005 | Aoki |
| 2007/0112612 | A1 | 5/2007 | Dollens |
| 2009/0280898 | A1* | 11/2009 | Izumi .................. A63F 13/10 463/30 |
| 2009/0325711 | A1 | 12/2009 | Bronstein et al. |
| 2010/0062850 | A1 | 3/2010 | Uchibori et al. |
| 2011/0302090 | A1 | 12/2011 | Newpol et al. |
| 2012/0064972 | A1 | 3/2012 | Uchibori et al. |
| 2012/0131036 | A1 | 5/2012 | Averbuch |
| 2012/0309480 | A1 | 12/2012 | Kashitani |
| 2014/0162780 | A1 | 6/2014 | Suzuki |

FOREIGN PATENT DOCUMENTS

| | | |
|---|---|---|
| JP | 2012-053640 | 3/2012 |
| JP | 2014-113249 | 6/2014 |

OTHER PUBLICATIONS

EA finally entry to the browser game., 4gamer, Apr. 21, 2010, URL,https://www.4gamer.net/games/108/G010890/20100421008.

Explanation of game screen, Wikipedia site of "Lord of Ultima", Aug. 27, 2012, URL,https://web.archive.org/web/20120827190218/http://louwiki.web.fc2.com/gamen.html, together with a partial English language translation.

Happy Street Trivia for beginners, Rakuten Blog Horusuke's diary, Oct. 26, 2012, URL,https://plaza.rakuten.co.jp/horusuke/diary/201210250000/, together with a partial English language translation.

Internet Document, Square Enix Co., Ltd, copyright dated 2010-2014, available at http://sengokuixa.jp/help.ixa_help04.html, accessed on Nov. 18, 2013, together with a partial English language translation.

Internet Document, Square Enix Co., Ltd, copyright dated 2010-2014, available at http://sengokuixa.jp/, accessed on Feb. 28, 2014.

Office Action from Japan Patent Office (JPO) in Japanese Patent Appl. No. 2014-146902, dated Jan. 10, 2017, together with a partial English language translation.

QBIST Inc., "Sengokuixa Official Guidebook—Shinan no Sho", Square Enix Co., Ltd., Jun. 1, 2011, pp. 14-25.

"Kunitsuku Going Out Is Fun", appli-Style, Eastpress, Jan. 15, 2012, vol. 6, pp. 116-117.

Office Action from Japan Patent Office (JPO) in Japanese Patent Appl. No. 2017-132808, dated Jul. 3, 2018, together with an English language translation.

Office Action from Japan Patent Office (JPO) in Japanese Patent Appl. No. 2017-132808, dated Apr. 16, 2019, together with an English language translation.

"IXA Fortune" NAISEI-Bonus and "Construction reservation", "Sengokuixa" Capture•Diary, Aug. 14, 2012, pp. 1-2, [online][searched on Mar. 29, 2019], URL, http://sengokuixa.seesaa.net/article/286649981.html, together with a partial English language translation.

\* cited by examiner

Fig. 1

100: VIDEO GAME PROCESSING APPARATUS

EVENT INFORMATION

| EVENT NUMBER | EVENT EXECUTION TIME (MINUTES) | ... |
|---|---|---|
| I0001 | 10 | ... |
| I0002 | 15 | ... |
| ⋮ | ⋮ | ⋮ |

Fig .4

EVENT MANAGEMENT INFORMATION

| EXECUTING EVENT RELATED INFORMATION | | | | TOTAL REMAINING TIME | MAXIMAL ALLOWED TIME |
|---|---|---|---|---|---|
| EVENT NUMBER | REMAINING TIME (MINUTES) | ... | ... | | |
| I0001 | 8 | ... | ... | 63 | 120 |
| I0002 | 15 | ... | ... | | |
| I0001 | 10 | ... | ... | | |
| I0002 | 15 | ... | ... | | |
| I0002 | 15 | ... | ... | | |
| ⋮ | ⋮ | ⋮ | ⋮ | ⋮ | ⋮ |

VIDEO GAME PROCESSING APPARATUS AND VIDEO GAME PROCESSING PROGRAM

CROSS-REFERENCE TO RELATED APPLICATION

The present application is a continuation application of U.S. patent application Ser. No. 15/601,381, filed May 22, 2017, which is a continuation application of U.S. patent application Ser. No. 14/093,163, filed Nov. 29, 2013, which claims the benefit of Japanese Patent Application No. 2012-268382, filed Dec. 7, 2012. The disclosure of each of the above-identified applications, including the specification, drawings, and claims, is incorporated herein by reference in its entirety.

BACKGROUND OF THE INVENTION

1. Field of the Invention

The present invention relates to a technique for controlling progress of a video game.

2. Description of the Related Art

In a conventional online game system, there is one in which a player constructs an in-game facility or the like using an in-game resource in order to make his or her own territory prosperous.

Such a system is configured so that construction of in-game facilities and the like (hereinafter, referred to as a "facility") is caused to make progress the predetermined number by the predetermined number (for example, one). Thus, there is one in which a player is allowed to specify the specific number of facilities and make a construction reservation, and further, an upper limit of the number of construction reservations of facilities can be increased by using an in-game item (for example, URL: http://sengokuixa.jp/help/ixa_help04.html, and http://w327.sengokuixa.jp/cp/item_list.php).

However, in the conventional system, there has been a problem that it may be different for the player to understand a full picture of a construction plan in a case where construction of plural kinds of facilities in each of which a time (the number of required construction) required until the construction is completed is reserved.

Further, it is thought that not only in construction of a facility, but such a problem also exists in a video game in which an in-game event (hereinafter, referred to as an "event") including a temporal element is provided.

SUMMARY OF THE INVENTION

The present invention has been made in order to solve the problem described above, and it is an object of the present invention to be capable of providing a video game in which a player can understand a progress status of an event by intuition.

In order to achieve the above object, in one aspect of the present invention, the present invention is directed to a video game processing apparatus for controlling progress of a video game. The video game processing apparatus according to the present invention includes an event information memory for storing event information, the event information containing one or more event carried out in the video game and an event execution time, the event execution time being defined in advance as a time from when the corresponding event is started to when the event is ended.

The video game processing apparatus also includes an event management information memory for storing event management information, the event management information containing executing event related information on one or more executing event and a maximal allowed time, the one or more executing event is an event under execution, the maximal allowed time being allowed as the maximum of a total time of a remaining time of each of the one or more executing event.

The video game processing apparatus also includes an executing event related information updater for updating the executing event related information in accordance with elapse of time.

The video game processing apparatus also includes an event progress status graph display controller for causing a display device to display an event progress status graph on a display screen of the display device on the basis of the event management information, the event progress status graph indicating a status of the remaining time of each of the one or more executing event in the maximal allowed time.

By configuring the video game processing apparatus as described above, it is possible to provide a video game in which a player can understand a progress status of an event by intuition.

In the video game processing apparatus according to the present invention, it is preferable that the video game processing apparatus further includes: an event execution request receiver for receiving an execution request for an event, the execution request specifying any one of the one or more event contained in the event information; an execution time confirmer for confirming whether the event execution time of the event received by the event execution request receiver is secured or not by referring to the event information and the event management information; and an event management information adder for starting execution of the event for which the execution request is received in a case where the execution time confirmer confirms that the event execution time is secured, the event management information adder adding executing event related information on the executing event whose execution is started to the event management information.

In the video game processing apparatus according to the present invention, it is preferable that the event progress status graph is a bar-shaped graph whose length is formed so as to correspond to the maximal allowed time, and the bar-shaped graph is configured so that a scale having a length corresponding to a remaining time of each of the one or more executing event is arranged within the bar-shaped graph, wherein, in accordance with the executing event related information in the event management information, the event progress status graph display controller causes the display section to display the event progress status graph so that the length of each scale is reduced to a length corresponding to the remaining time of the executing event.

In the video game processing apparatus according to the present invention, it is preferable that the event progress status graph is a circular-shaped graph formed so that the maximal allowed time corresponds to a maximal angle of circumference, and the circular-shaped graph is configured so that a scale of an angle corresponding to the remaining time of each executing event is arranged within the circular-shaped graph, wherein, in accordance with the executing event related information in the event management information, the event progress status graph display controller causes the display device to display the event progress status graph so that the angle of each scale is reduced to an angle corresponding to the remaining time of the executing event.

In the video game processing apparatus according to the present invention, it is preferable that the video game processing apparatus further includes a maximal allowed time updater for updating the maximal allowed time in the event management information in accordance with a progress status of the video game so as to increase the maximal allowed time.

Moreover, in another aspect of the present invention, the present invention is directed to a non-transitory computer-readable medium including a video game processing program product for causing a computer to control progress of a video game. In this case, the computer includes: an event information memory for storing event information, the event information containing one or more event carried out in the video game and an event execution time, the event execution time being defined in advance as a time from when the corresponding event is started to when the event is ended; and an event management information memory for storing event management information, the event management information containing executing event related information on one or more executing event and a maximal allowed time, the one or more executing event is an event under execution, the maximal allowed time being allowed as the maximum of a total time of a remaining time of each of the one or more executing event.

The video game processing program product causes the computer to execute steps including updating the executing event related information in accordance with elapse of time.

The steps also include causing a display device to display an event progress status graph on a display screen of the display device on the basis of the event management information, the event progress status graph indicating a status of the remaining time of each of the one or more executing event in the maximal allowed time.

According to the present invention, it is possible to provide a video game in which a player can understand a progress status of an event by intuition.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings.

DETAILED DESCRIPTION OF THE INVENTION

Hereinafter, an example of one embodiment of the present invention will be described with reference to the appending drawings.

Figure 1:
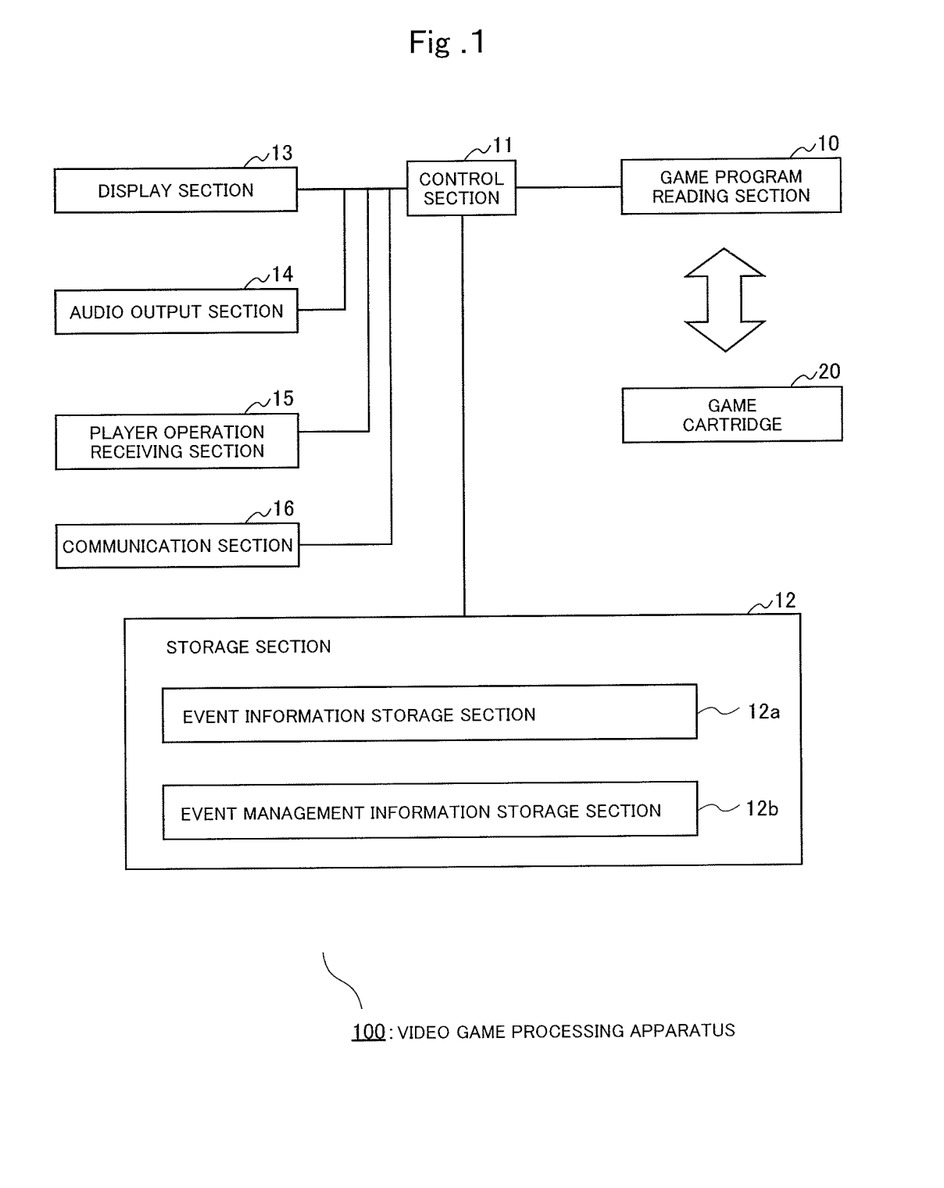
FIG. 1 is a block diagram showing a configuration example of a video game processing apparatus.

FIG. 1 is a block diagram showing a configuration example of a video game processing apparatus 100 according to one embodiment of the present invention. As shown in FIG. 1, the video game processing apparatus 100 includes: a game program reading section 10; a the control section 11; a storage section 12; a display section 13; an audio output section 14; a player operation receiving section 15; and a communication section 16.

The game program reading section 10 has a function to read out a necessary video game program from a storage medium. Various kinds of video game programs are stored in the storage medium. In this regard, in the present embodiment, the game program reading section 10 has a mounting section into which a game cartridge 20, in which the video game program is stored, is detachably mounted. A player (that is, an operator (or a user) of the video game processing apparatus 100) reads out a video game program from a storage medium of the game cartridge 20 that is mounted into the mounting section, and stores the read-out video game program in the storage section 12. In this regard, a video game carried out in accordance with the video game program used in the present embodiment may be any one such as an RPG, a simulation game, a puzzle game and a battle game so long as the video game is a video game that includes an event as an element of the video game. In this regard, as examples of the event, various kinds of events including: events regarding virtual facilities of an in-game such as construction, destruction, relocation, extension, rebuilding of the facility; and events regarding characters of the in-game such as recovery of a character, level up, execution of a command are thought.

The control section 11 has a function to execute a game program read out by the game program reading section 10 and stored in the storage section 12, and a function to carry out various kinds of controls to cause the video game to proceed in response to an operation of the player.

Figure 2:
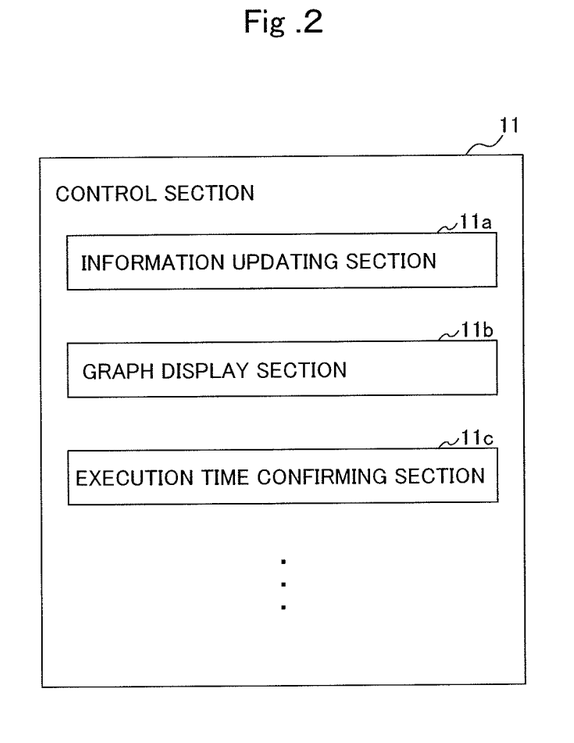
FIG. 2 is an explanatory drawing for explaining an example of a configuration of a control section.

FIG. 2 is an explanatory drawing for explaining an example of a configuration of the control section 11 according to the present embodiment. As shown in FIG. 2, the control section 11 includes an information updating section 11a, a graph display section 11b and an execution time confirming section 11c.

The information updating section 11a has a function to carry out a process to update various kinds of information stored in the storage section 12 in accordance with a predetermined update condition. In this regard, the content of the update condition is not particularly limited. However, in the present embodiment, the information updating section 11a may update predetermined information in accordance with an actual elapse of time (that is, the elapsed time including not only a playing time of the user but also an elapse of time when the user does not play the video game).

The graph display section 11b has a function to carry out a process to cause the display section 13 to display a graph regarding a progress status of the video game on the display screen on the basis of various kinds of information stored in the storage section 12.

The execution time confirming section 11c has a function to carry out a process to confirm whether a time required executing an event (that is, an execution time for the event) is secured as a time allowed for the user or not by referring to various kinds of information stored in the storage section 12.

The storage section 12 is a storage medium for storing video game programs necessary when the video game is caused to proceed and various kinds of data. The storage section 12 is configured by a nonvolatile memory such as a RAM, for example. In the storage section 12, various kinds of information registered and updated in accordance with progress of the video game, and various kinds of information used in the video game, which are read out from the storage medium embedded into the game cartridge 20, are stored.

In this regard, the video game processing apparatus 100 may be configured so that the video game program is downloaded from a video game program providing server (not shown in the drawings) via a communication network such as the Internet or the like and is stored in the storage section 12.

In the present embodiment, the storage section 12 includes an event information storage section 12a and an event management information storage section 12b.

The event information storage section 12a is a storage medium for storing event information. The event information is information on an event to be carried out (executed) in the video game.

Figure 3:
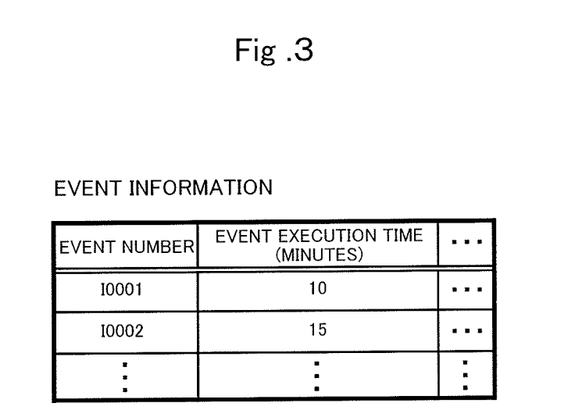
FIG. 3 is an explanatory drawing showing an example of a storage state of event information.

FIG. 3 is an explanatory drawing showing an example of a storage state of the event information stored in the event information storage section 12a. As shown in FIG. 3, the event information contains: an event number for uniquely specifying an event; and a time (event execution time) defined in advance as a time from when the event indicated by the event number is started to when the event is ended.

The event management information storage section 12b is a storage medium for storing event management information. The event management information is information for managing an event under execution in the video game.

Figure 4:
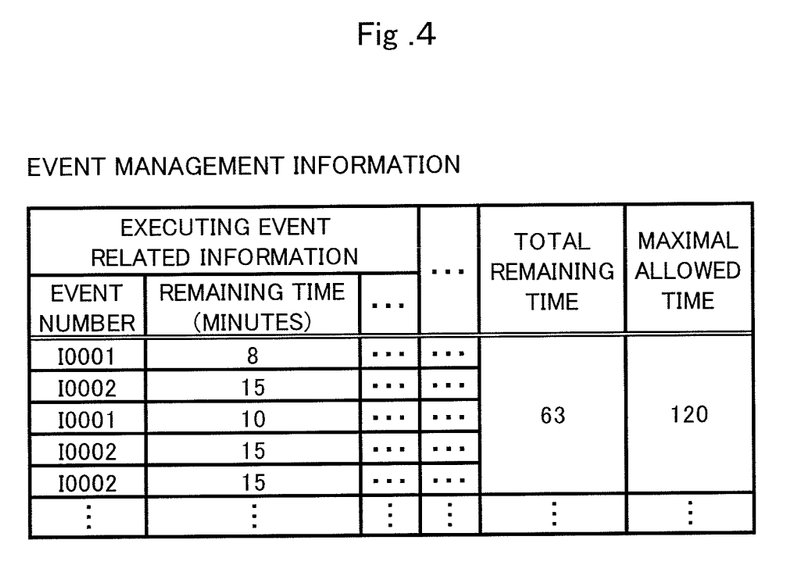
FIG. 4 is an explanatory drawing showing an example of a storage state of event management information.

FIG. 4 is an explanatory drawing showing an example of a storage state of the event management information stored in the event management information storage section 12b. As shown in FIG. 4, the event management information contains: executing event related information; a time (total remaining time) until all of one or more event under execution (that is, one or more executing event) is ended; and a time (maximal allowed time) allowed as the maximum of a total time (that is, a total remaining time) of times until each of the one or more executing event is ended (a remaining time).

Here, the executing event related information is information relating to an executing event that is an event under execution. In the present embodiment, an event number for uniquely specifying an executing event and a remaining time are contained in the executing event related information. The remaining time is a time until the executing event is ended.

The display section 13 is a display device for displaying the game screen in response to operations by the player in accordance with control by the control section 11. The display section 13 is constructed by a liquid crystal display, for example.

The audio outputting section 14 outputs audio in response to operations by the player and progress of the video game in accordance with control by the control section 11.

The player operation receiving section 15 receives operational signals in response to operations by the player, and notifies the control section 11 of that result. In the present embodiment, the player operation receiving section 15 is configured so as to receive an operation of the player via a touch panel provided in the display section 13. In this regard, the video game processing apparatus 100 may be configured so that the player operation receiving section 15 receives an operation of the player via a controller such as a mouse and a game pad.

The communication section 16 causes the video game processing apparatus 100 to connect to a communication network such as the Internet by wireless or wired connections, and to transmit and receive various kinds of information.

Next, an outline of the video game carried out by the video game processing apparatus 100 according to the present embodiment will be described. In the video game processing apparatus 100 according to the present embodiment, a video game in which the player strengthens his or her area (base) by constructing a facility in the base is carried out. More specifically, the player plays the video game by appropriately selecting three major elements. The major elements include: (1) a first element (base strengthening element) to strengthen the player's base by carrying out production of a resource in the base, construction of a facility and production of military force; (2) a second element (troop strengthening element) to strengthen his or her troop by playing the video game to acquire a virtual card; and (3) a third element (battle element) to carry out match-up against a troop of other player with communication (PvP), an event battle carried out to a limited extent by providing a period, and a time elapse type battle by alliance partners using a battle dedicated MAP. Hereinafter, the base strengthening element that is an element relating to the present invention will be described further.

Figure 5:
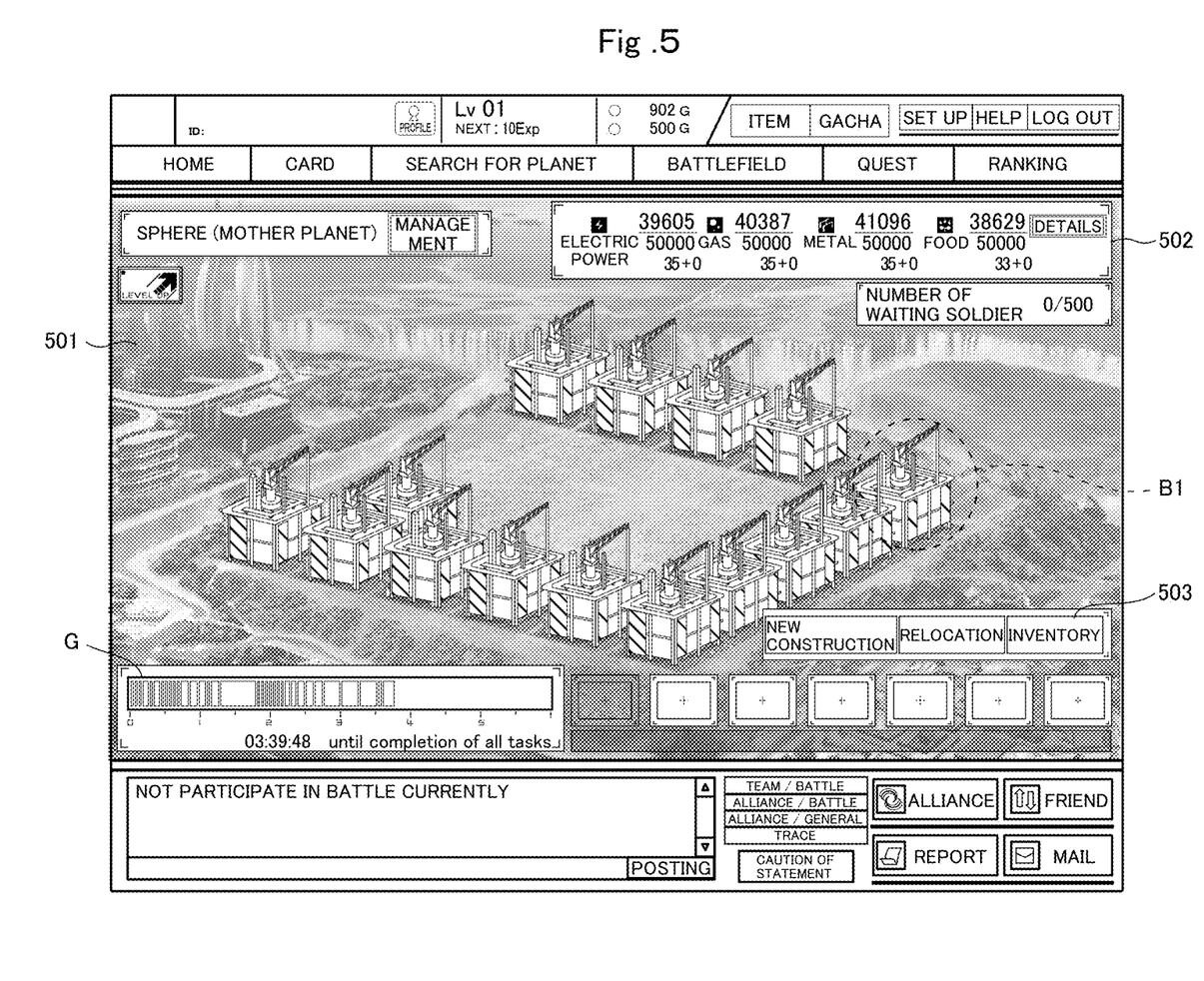
FIG. 5 is an explanatory drawing for explaining an outline of the video game.

FIG. 5 is an explanatory drawing for explaining an outline of the video game carried out in the video game processing apparatus 100 according to the present embodiment. As shown in FIG. 5, in the base strengthening element of the video game, a video game (that is, a so-called community development game) in which the player constructs a facility in a virtual field 501 applied as his or her territory is carried out. The facility is constructed by consuming a resource displayed in a resource display area 502. The player takes into consideration the amount of his/her own resources and characteristics of a constructible facility, and appropriately selects an operation item displayed in an operation item display area 503; thereby carrying out a construction instruction for the facility.

When the player carries out the construction instruction for the facility, the display section 13 displays a construction progress object (for example, a construction progress object B1) according to the construction instruction in the virtual field 501. The construction object progress object is changed into an object indicating the facility according to the construction instruction when a time required for construction (hereinafter, referred to as a "construction required time") (that is, an event execution time) associated with the facility according to the construction instruction elapses since the construction object progress object has been displayed in the virtual field 501. In this regard, in the present embodiment, the case where a construction progress object that is not changed in accordance with the type of facility or a time until completion of construction (that is, a time obtained by subtracting the elapsed time from the event execution time, i.e., a remaining time) is displayed will be described as an example. However, the configuration of the construction progress object is not limited to this configuration. The video game processing apparatus 100 may be configured so that a construction progress object for constructing a large facility is displayed to be different from that in a case of constructing a small facility, for example. Alternatively, the video game processing apparatus 100 may be configured so that a form of the construction progress object is changed in accordance with a ratio of the remaining time to the event execution time (for example, the form of the construction progress object is changed in accordance with an elapse of time so as to come closer to a form of the facility to be constructed).

Further, as shown in FIG. 5, an event progress status graph (task bar) G is displayed on the game screen. The event progress status graph G indicates a status of a time (remaining time) until construction of each facility under construction is completed. In the present embodiment, the event progress status graph G is displayed as a bar-shaped graph (or a bar graph, a bar chart) in which a scale of the length corresponding to the remaining time of each of a plurality of construction progress objects including the construction progress object B1 is arranged. Further, the length of the event progress status graph G is displayed as a length corresponding to the maximum amount that the player can make construction instructions (that is, a total amount of the event execution times of the facilities). Namely, the longer the event progress status graph G has, the more the player can make construction instructions for facilities at a time. In this regard, the player can make the length of the event progress status graph G longer by meeting a predetermined condition in accordance with progress of the video game.

Further, in the present embodiment, construction of a facility in the virtual field 501 is caused to make progress for every facility. Namely, while construction of a first facility is caused to make progress, the player is allowed to provide a construction instruction for a second facility as a construction reservation. The maximum number of construction reservations is not determined by the number of facilities, but determined by the sum of the construction required times corresponding to the respective facilities. Further, the control section 11 causes a length of the scale arranged at the leftmost side of the scales arranged in the event progress status graph G to be reduced in accordance with an elapse of time. However, a method of causing construction of a facility to make progress is not limited to this. For example, the video game processing apparatus 100 may be configured so that the control section 11 causes construction of the predetermined number or all of facilities to make progress in parallel in accordance with the elapsed time (that is, each of a plurality of scales arranged in the event progress status graph G is reduced in accordance with the elapsed time).

A performance of the base of the player (for example, durability and productivity) is determined on the basis of the number of facilities constructed in a virtual field and the type of each of the facilities. Therefore, a player who constructs a lot of better facilities can cause the video game to make progress more advantageously than other players. However, since the other elements (the troop strengthening element and the battle element) other than the base strengthening element are not related to the present invention directly, detailed description thereof will be omitted herein.

Next, an operation of the video game processing apparatus 100 according to the present embodiment will be described.

Figure 6:
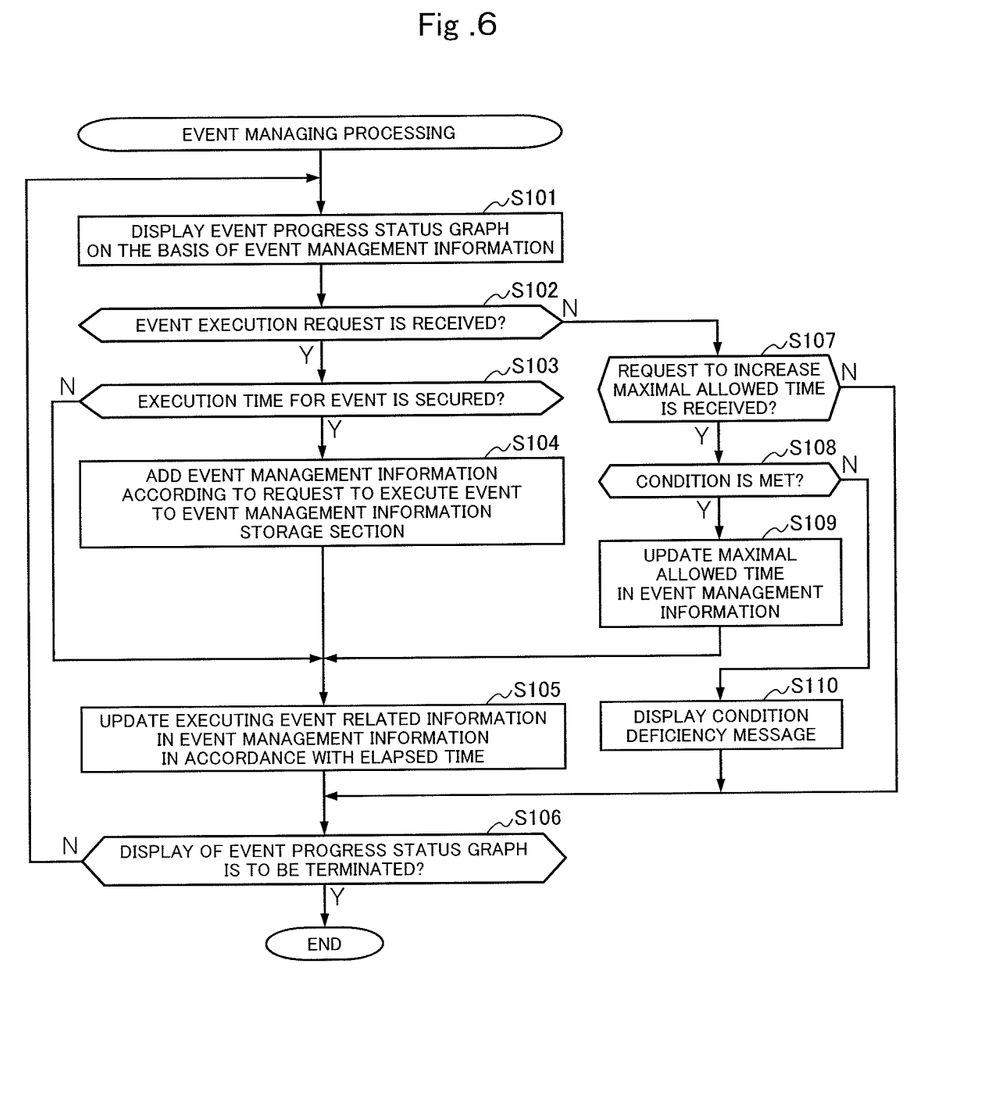
FIG. 6 is a flowchart showing an example of event managing processing.

FIG. 6 is a flowchart showing an example of event managing processing carried out by the video game processing apparatus 100. In the event management processing, a process to manage an event that occurs in accordance with progress of the video game is carried out. In this regard, the content of processing with no relationship to the present invention may be omitted.

The event management processing is started in a case where the control section 11 determines that the display section 13 displays a game screen including an event progress status graph G in response to an instruction from the player, for example. Hereinafter, the event management processing will be described with reference to FIG. 5 properly.

In the event management processing, the control section 11 first causes the display section 13 to display the event progress status graph G in a predetermined area (for example, at a lower left of the screen) of the game screen on the basis of the event management information (Step S101).

When the event progress status graph G is displayed, the control section 11 determines whether a request to execute an event (that is, an event execution request) is received or not (Step S102). Here, in a case where it is determined that the request to execute the event is received, for example, because an operation item "new construction" displayed in the operation item display area 503 is selected ("Yes" at Step S102), the control section 11 determines whether an execution time for the event is secured or not (Step S103). In this regard, in the present embodiment, the control section 11 causes the display section 13 to display a predetermined facility type selecting screen in a case where the operation item "new construction" is selected. The control section 11 then specifies a type of the facility to be newly constructed (or built). As for determination of whether the execution time for the event is secured or not, the control section 11 determines that the execution time for the event is secured in a case where the construction required time (that is, event execution time) according to the type of the facility is a value obtained by subtracting a total remaining time from the maximal allowed time (see FIG. 4) or less.

In a case where it is determined that the execution time for the event is not secured ("No" at Step S103), the control section 11 causes the processing flow to proceed to a process at Step S106 (will be described later). On the other hand, in a case where it is determined that the execution time for the event is secured ("Yes" at Step S103), the control section 11 adds the event management information according to the request to execute the event to the event management information storage section 12b (Step S104). In this regard, in the present embodiment, the control section 11 causes the display section 13 to display an object according to "construction of a facility" as the event (for example, the construction progress object B1) in the virtual field 501 at this time; and updates a form of the event progress status graph G in accordance with the content of the added event management information (in particular, the remaining time). In the present embodiment, the control section 11 arranges a scale having a length corresponding to the remaining time of the added event management information on the right side of other scales arranged in the event progress status graph G. Moreover, in a case where any other event management information is not stored in the event management information storage section 12b at this time, the control section 11 starts execution of the event indicated by the added event management information (that is, the control section 11 starts measuring the corresponding remaining time). On the other hand, in a case where there is other event management information that has been added previously, the control section 11 sets the event indicated by the event management information that is added this time to a standby state (that is, does not carry out measuring the corresponding remaining time), and starts the event after the event indicated by the event management information that has been added previously is ended.

When the event management information is added, the control section 11 updates the executing event related information in the event management information in accordance with the elapsed time (Step S105). In the present embodiment, the control section 11 reduce the remaining time, for the facility for which construction makes progress, in accordance with the elapsed time. Further, the control section 11 deletes the event management information corresponding to the facility whose remaining time becomes "0 (zero)" from the event management information storage section 12b. Further, although it is not shown in the drawings, the control section 11 stores information regarding the facility for which the construction is completed in a predetermined storage area of the storage section 12.

When the executing event related information is updated, the control section 11 determines whether display of the event progress status graph G is to be terminated or not (Step S106). Here, in a case where it is determined that the display of the event progress status graph G is not to be terminated ("No" at Step S106), the control section 11 causes the processing flow to proceed to the process at Step S101. On the other hand, in a case where it is determined that the display of the event progress status graph G is to be terminated, for example, because a transition request to other game screen is received ("Yes" at Step S106), the control section 11 terminates the processing herein.

On the other hand, in a case where it is determined, at the process at Step S102 in the event management processing, that no execution request for an event is not received ("No" at Step S102), the control section 11 determines whether a request to increase the maximal allowed time is received or not (Step S107). Here, in a case where it is determined that no request to increase the maximal allowed time is received ("No" at Step S107), the control section 11 causes the processing flow to proceed to the process at Step S106.

On the other hand, in a case where it is determined that a request to increase the maximal allowed time is received, for example, by receiving an input of a predetermined operation by the player ("Yes" at Step S107), the control section 11 determines whether a condition regarding an increase of the maximal allowed time is met or not (Step S108). Here, in a case where it is determined that the condition is met, for example, by referring to player information indicating a progress status of the video game by the player ("Yes" at Step S108), the control section 11 updates the maximal allowed time so that the maximal allowed time in the event management information is increased (Step S109), and causes the processing flow to proceed to the process at Step S106. In the present embodiment, the control section 11 causes the display section 13 to display the event progress status graph G on the game screen at this time. The event progress status graph G is configured so as to have a length according to the maximal allowed time after increase (that is, the increased maximal allowed time).

On the other hand, in a case where it is determined that the condition is not met ("No" at Step S108), the control section 11 causes the display section 13 to display a predetermined condition deficiency message on the display screen (Step S110), and causes the processing flow to proceed to the process at Step S106.

As explained above, in the embodiment described above, the video game processing apparatus 100 for controlling progress of the video game is configures so as to: include the event information storage section 12a for storing event information, the event information containing one or more event carried out in the video game (for example, construction of a facility) and an event execution time (for example, construction required time), the event execution time being defined in advance as a time from when a corresponding event is started to when the event is ended; include the event management information storage section 12b for storing event management information (for example, an event number and a remaining time), the event management information containing executing event related information on an executing event and a maximal allowed time, the executing event is an event under execution, the maximal allowed time being allowed as the maximum of a total time of a remaining time of one or more executing event; update the executing event related information in accordance with the elapse of time (for example, Step S105); and cause the display section 13 to display an event progress status graph on a display screen of the display device on the basis of the event management information, the event progress status graph indicating a status of the remaining time of each of the executing events in the maximal allowed time (for example, Step S101). Therefore, it is possible to provide a video game in which the player can understand a progress status of each of the events by intuition.

Namely, the video game processing apparatus 100 may be configured so as to provide an upper limit (the maximal allowed time) for the total time of the remaining times of the executing events; and cause the display section 13 to display a status of the remaining time of each of the events as a graph. Therefore, by confirming the remaining time against the maximal allowed time, the player is allowed to understand the progress status of each of the events by intuition.

Further, since it is determined whether an event start request from the player is allowed (or permitted) on the basis of the time, it becomes possible to provide a consideration different from that based upon the number (of events) to the player. As a result, it is possible to prompt the player to use an in-game item from a viewpoint different from a conventional video game.

Further, in the embodiment described above, the video game processing apparatus 100 may be configured so as to: receive an execution request for an event, the execution request specifying any one of the one or more event contained in the event information (for example, Step S102); confirm whether the event execution time of the event received by the event execution request receiver is secured or not by referring to the event information and the event management information (for example, Step S103); and start execution of the event for which the execution request is received in a case where the execution time confirmer confirms that the event execution time is secured (for example, "Yes" at Step S103), and add executing event related information on the executing event whose execution is started to the event management information (for example, Step S104). Therefore, it is possible to provide a video game in which the player can understand an event, which can be added newly, by intuition.

Further, in the embodiment described above, the video game processing apparatus 100 may be configured so that: the event progress status graph G is a bar-shaped graph whose length is formed so as to correspond to the maximal allowed time, and the bar-shaped graph is configured so that a scale having a length corresponding to a remaining time of each of the one or more executing event is arranged within the bar-shaped graph (see FIG. 5); and in accordance with the executing event related information in the event management information, the video game processing apparatus 100 causes the display section 13 to display the event progress status graph G so that the length of each scale is reduced to a length corresponding to the remaining time of the executing event. Therefore, it is possible to cause the player to recognize a progress status of each of a plurality of events by intuition.

In this regard, although the case where the event progress status graph is a bar graph has been described in the embodiment described above (see FIG. 5), the configuration of the event progress status graph is not limited to this configuration. The video game processing apparatus 100 may be configured so that: the event progress status graph is a circular-shaped graph G formed so that the maximal allowed time corresponds to a maximal angle of circumference, and the circular-shaped graph is configured so that a scale of an angle corresponding to the remaining time of each executing event is arranged within the circular-shaped graph, for example; and in accordance with the executing event related information in the event management information, the video game processing apparatus 100 causes the display section 13 to display the event progress status graph G so that the angle of each scale is reduced to an angle corresponding to the remaining time of the executing event. By configuring the video game processing apparatus 100 so that the player can visually recognize the progress status of the event, in particular, the time until the executing event is ended using the event progress status graph G, it is possible to reduce a stress of the player when he or she plays the video game.

Further, in the embodiment described above, the video game processing apparatus 100 may be configured so as to update the maximal allowed time in the event management information in accordance with a progress status of the video game (for example, a level of the player, a solution status of an in-game problem, a possessed item, a billing status and the like) so as to increase the maximal allowed time (for example, Step S109). Therefore, in a case where an increase condition of the maximal allowed time is set to the possessed item, it is possible to prompt the player to use the possessed item, for example. This makes it possible to realize an adventitious effect obtained by allowing the player to understand a progress status of the event by means of the event progress status graph.

In this regard, although it has not been mentioned particularly in the embodiment described above, the video game processing apparatus 100 may be configured so as to: receive selection of a scale of the event progress status graph G; specify an event corresponding to the selected scale; and cause the display section 13 to display a progress status f the specified event (for example, cause the display section 13 to display a balloon image from the scale, and cause the display section 13 to display a character string and/or an image indicating a progress status of the event within the balloon). By configuring the video game processing apparatus 100 in this manner, it becomes possible to provide a video game in which the player can further understand a progress status of each event by intuition.

In this regard, although it has not been mentioned particularly in the embodiment described above, the video game processing apparatus 100 may be configured so as to: receive selection of the scale of the event progress status graph G; specify an event corresponding to the selected scale; receive a request to change an execution order or a request to cancel the execution for the specified event; and update the event management information in accordance with the received request to change an execution order or request to cancel the execution. By configuring the video game processing apparatus 100 in this manner, it is possible to provide a video game in which the player can manage progress of a plurality of events easily.

In this regard, in the embodiment described above, the video game processing apparatus 100 is configured so as to carry out various kinds of processings such as game processing described above on the basis of the video game program read out from the game cartridge 20. However, the video game processing apparatus 100 may be configured so as to acquire the video game program via the communication network such as the Internet. Further, the video game processing apparatus 100 may be configured so as to function as a video game server to provide the video game program to a video game terminal via the communication network. Further, the video game which progress the video game processing apparatus according to the present invention controls may be a so-called browser game.

Further, in the embodiment described above, the video game processing apparatus 100 carries out the various kinds of processes described above in accordance with various kinds of control programs (for example, the video game processing program product) stored in a storage device (the storage section 12) with which the video game processing apparatus 100 itself is provided.

INDUSTRIAL APPLICABILITY

The present invention is useful to provide a video game in which a player can understand a progress status of an event by intuition.

What is claimed is:

1. A video game processing apparatus for controlling progress of a video game, the video game processing apparatus comprising:
  an event information memory for storing event information, the event information containing one or more events carried out in the video game and an event execution time, the event execution time being defined in advance as a time from a time when the corresponding event is started to a time when the corresponding event is ended;
  an event management information memory for storing event management information, the event management information containing executing event related information on one or more executing events, the one or more executing events being an event under execution;
  a controller for updating the executing event related information in accordance with an actual elapse of time, the actual elapse of time including a playing time of a user and an elapse of time when the user does not play the video game; and
  the controller for causing a display device to display an event progress status graph on a display screen of the display device on a basis of the event management information, the event progress status graph indicating a status of a remaining time of each of the one or more executing events,
  wherein the video game processing apparatus progresses each executing event of the one or more executing events from the time when the executing event is started to the time when the executing event is ended, based on the event information stored in the event information memory,
  the executing event is ended when the remaining time becomes zero,
  the remaining time of each executing event of the one or more executing events is a time execution time less than the elapse of time for the executing event, based on the event information stored in the event information memory,
  the event progress status graph allows the user to visually recognize progress states of the one or more executing events,
  during the video game, the one or more events are directed toward at least one of a base strengthening element, a troop strengthening element, and a battle element, and the base strengthening element comprises constructing a facility in a virtual field by consuming a resource.

2. The video game processing apparatus according to claim 1, wherein the event management information memory is for further storing a maximal allowed time, the maximal allowed time being a maximum of a total allowed time of the remaining time of each of the one or more executing events, and the event progress status graph indicates the status of the remaining time of each of the one or more executing events in the maximal allowed time, a plurality of scales provided in the event progress status graph being reduced to a length corresponding to the remaining time of the executing event, in accordance with the elapse of time.

3. The video game processing apparatus according to claim 2, further comprising:

a receiver for receiving an execution request for an event, the execution request specifying any one of the one or more events contained in the event information, wherein the controller confirms whether the event execution time of the event received by the receiver is secured or not by referring to the event information and the event management information, and the controller starts execution of the event for which the execution request is received, when the event execution time is secured, and adds executing event related information, on the executing event for which the execution is started, to the event management information.

4. The video game processing apparatus according to claim 2, wherein the event progress status graph is a task bar including a length corresponding to the maximal allowed time, and the task bar is configured so that a scale having a length corresponding to the remaining time of each of the one or more executing events is provided within the task bar, and in accordance with the executing event related information in the event management information, the controller causes the display device to display the event progress status graph such that the length of each scale is reduced to a length corresponding to the remaining time of the executing event.

5. The video game processing apparatus according to claim 4, wherein the controller updates the maximal allowed time in the event management information in accordance with a progress status of the video game so as to increase the maximal allowed time.

6. The video game processing apparatus according to claim 2, wherein the event progress status graph is a circular-shaped graph configured such that the maximal allowed time corresponds to a maximal angle of circumference, and the circular-shaped graph is configured so that a scale of an angle corresponding to the remaining time of each executing event is provided within the circular-shaped graph, and in accordance with the executing event related information in the event management information, the controller causes the display device to display the event progress status graph such that the angle of each scale is reduced to an angle corresponding to the remaining time of the executing event.

7. The video game processing apparatus according to claim 6, wherein the controller updates the maximal allowed time in the event management information in accordance with a progress status of the video game so as to increase the maximal allowed time.

8. The video game processing apparatus according to claim 1, wherein the event progress status graph includes a plurality of bar graphs respectively indicating progress states of the one or more executing events.

9. The video game processing apparatus according to claim 1, wherein the event progress status graph collectively indicates a status of the remaining time of each of the one or more executing events.

10. The video game processing apparatus according to claim 1, wherein the video game processing apparatus is further configured to receive a request to change an execution order of events and to update the event management information in accordance with the change in the execution order.

11. The video game processing apparatus according to claim 1, wherein the video game processing apparatus is further configured to receive a request to cancel the execution of an event and to update the event management information in accordance with a cancellation of the execution of the event.

12. The video game processing apparatus according to claim 1, wherein the event progress status graph is configured to be made longer by meeting a predetermined condition in accordance with the progress of the video game.

13. The video game processing apparatus according to claim 12, wherein a number of instructions for constructing the facility in the virtual field increases in accordance with a length of the event progress status graph.

14. A non-transitory computer-readable medium including a video game processing program product for causing a computer to control progress of a video game, wherein the computer comprises:

an event information memory for storing event information, the event information containing one or more events carried out in the video game and an event execution time, the event execution time being defined in advance as a time from a time when the corresponding event is started to a time when the corresponding event is ended; and an event management information memory for storing event management information, the event management information containing executing event related information on one or more executing events, the one or more executing events is an event under execution, the video game processing program product causes the computer to execute:

updating the executing event related information in accordance with an actual elapse of time, the actual elapse of time including a playing time of a user and an elapse of time when the user does not play the video game; and causing a display device to display an event progress status graph on a display screen of the display device on a basis of the event management information, the event progress status graph indicating a status of a remaining time of each of the one or more executing events, the computer progresses each executing event of the one or more executing events from the time when the executing event is started to the time when the executing event is ended, based on the event information stored in the event information memory, the executing event is ended when the remaining time becomes zero, and the remaining time of each executing event of the one or more executing events is a time execution time less than the elapse of time for the executing event, based on the event information stored in the event information memory, the event progress status graph allows the user to visually recognize progress states of the one or more executing events, during the video game, the one or more events are directed toward at least one of a base strengthening element, a troop strengthening element, and a battle element, and the base strengthening element comprises constructing a facility in a virtual field by consuming a resource.

\* \* \* \* \*